Oct. 20, 1964  H. CHESSIN  3,153,279
HEAT RESISTANT SOLID STRUCTURE
Filed May 29, 1959
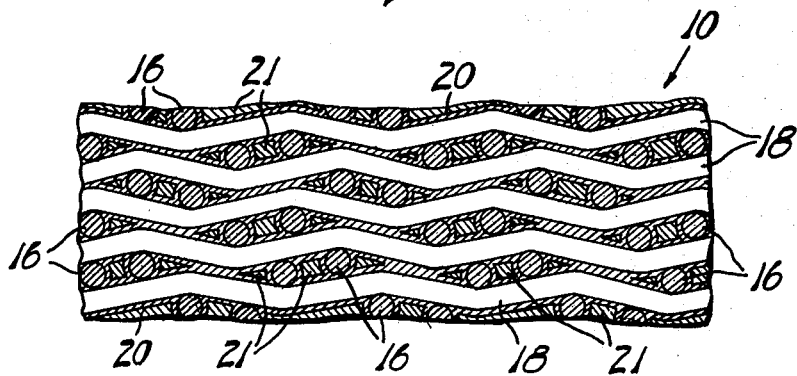
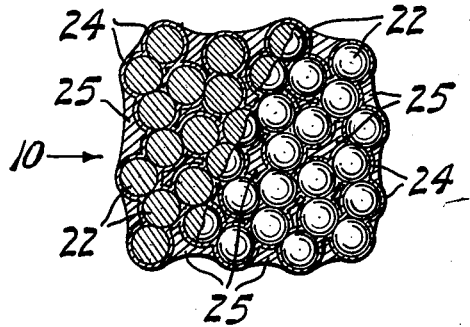 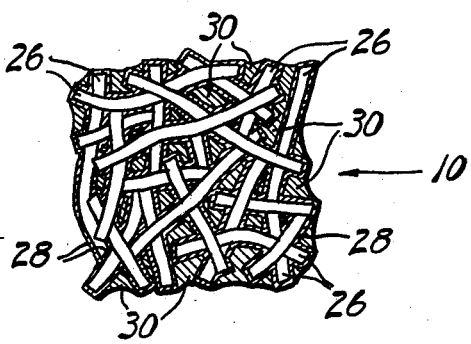
INVENTOR.
Hyman Chessin
BY
Beau, Brooks, Buckley & Beau.

3,153,279
HEAT RESISTANT SOLID STRUCTURE
Hyman Chessin, Olean, N.Y., assignor to Van Der Horst Corporation of America, Olean, N.Y.
Filed May 29, 1959, Ser. No. 816,956
6 Claims. (Cl. 29—420)

This invention relates to heat resistant structures and methods for producing the same; and more particularly to the fabrication of high heat-resistant structures for use for example in nose cones of missiles or rockets or other structures which encounter erosive and/or corrosive high temperature operating conditions. It has heretofore been proposed to coat structural panels with protective refractory layers composed of ceramics or the like, for example in connection with the missile industry, to enable the parts to retain their necessary strength and other structural characteristics at least throughout an operational cycle, but it is a primary object of the present invention to provide an improved structural panel or the like which will be of improved high temperature strength, and to an improved method for producing the same.

Another object is to provide structures and methods as aforesaid by virtue of which a porous basic structure is fabricated of any preferred refractory material or the like, the parts of which are inter-joined and uniformly coated in improved manner with a protective deposit functioning at the same time to structurally reenforce the basic or matrix material and to encapsulate the matrix parts in coatings to help guard against excessive volatization losses of the matrix material.

Other objects and advantages of the invention will appear from the specification hereinafter, and the drawing furnished herewith which is illustrative of the invention, and wherein:

FIG. 1 is a fragmentary schematic sectional view through one form of a fabrication of the invention; and FIGS. 2–3 are views corresponding to FIG. 1 but illustrating modified forms of fabrications of the invention.

FIG. 1 shows in greatly enlarged sectional form one form of fabrication such as will provide a heat resistant structural member 10. In this case the basic component is made by initially superposing any required number of layers of mesh fabrications comprising interwoven strands 16, 18 formed of some heat-resisting material such as for example the metal molybdenum, or the like. It will be appreciated that in order to build the member 10 to the desired thickness and of the desired porosity characteristics, a suitable number of layers of mesh material of suitable strand size and relative spacings will be initially stacked in layered form; and then if preferred, the stack may be "settled" or compacted by a pressure application.

The invention provides an improved method for treating the basic porous structure so as to at the same time structurally bond the screen layers together, and insulate the material of the screen members against excessive deterioration under high-temperature conditions. For this purpose the invention contemplates deposition of a suitable metalliferous material throughout the entire interior of the porous basic fabrication but only against the interstitial walls thereof, so as to uniformly coat every basic material surface with a protective material while avoiding plugging of the pores through the structure. The method of the invention provides an improved structural bonding of the screen elements throughout the entire interior of the fabrication by means of the protective coating as indicated at 20, the latter being so applied as to build up progressively against the interstitial surfaces of the fabrication at equal depths throughout the fabrication. Thus, the screen strands are encapsulated against high temperature deterioration. By this method porous structures of the desired characteristics for the purposes explained hereinabove may be provided.

Conventionally suggested methods for internally coating and reenforcing the basic structure are not suitable. For example, such processes as dipping the basic fabrication in molten metal; spraying molten material against the basic fabrication; or electroplating metal or other material onto the fabrication or the like, would be unsatisfactory. This is because such processes invariably result only in initially covering the outer surfaces of the fabrication in such manner as to seal off the interstices thereof at the outer surfaces of the structure, without getting into the interior of the fabrication. Thus, the objects and advantages of the present invention are not attainable by such methods.

The present invention contemplates deposition of the reinforcing and protective material interiorly of the fabrication by means of a process such as will operate simultaneously throughout the entire thickness of the porous basic fabrication. For example a method known in the trade as electroless plating may be employed; explanations of such processes being found for example in U.S. Patent Nos. 2,532,283 and 2,532,284. Or in lieu thereof a chemical replacement method may be employed as disclosed for example in U.S. Patents 2,873,214 and 2,873,216. Or, in lieu thereof a thermal decomposition method or a vapor deposition method may be employed such as disclosed for example in U.S. Patents 2,653,879 and 2,815,299. In any case, because of the nature of the method involved, the internal structural reenforcing and surface insulating operation will take place simultaneously and uniformly throughout the entire interior of the basic structure, as distinguished from the surface sealing results obtained when attempting to use for such purposes conventional electroplating or molten metal dipping or spraying methods, or the like.

I then incorporate for example within the pores of the reenforced basic structure, by any suitable means such as dipping, a ceramic material as indicated at 21. For example, a structure of the invention may comprise basically a wire cloth of molybdenum because of the high temperature strength of this metal; and this may be bound into a single structure as explained hereinabove with any protective high temperature metal which can be deposited for example from the vapor phase, such as tungsten or chromium. The porous structure so obtained is then subsequently impregnated with a ceramic or other refractory material such as alumina as illustrated at 21 (FIG. 1). The resulting structure will be stronger and will have better high temperature resistance than structures formed by other methods of the prior art.

Another example of the invention, useful for example as an expendable-type nose cone, would employ a similar screen structure bound together by a metal deposited from the fluid phase. In this case also, a base metal such as molybdenum wire cloth may be used because of molybdenum's inherent high temperature strength. The molybdenum screen may be bound together by molybdenum, or perhaps by a more refractory material such as tungsten, or perhaps by a material of lower melting point such as nickel. Within this structure, rather than employing a ceramic material I may incorporate a metal or an oxide or a chemical compound having a melting point such that when this material within the matrix melts its absorption of heat by fusion will tend to maintain a relatively cool temperature within and throughout the structure.

By way of another example, I may use the molybdenum screen bound together by a molybdenum deposit. Within this porous structure, I may incorporate, nickel, perhaps by dipping the porous structure in a molten nickel bath. The nickel will serve a twofold purpose. It will protect the molybdenum from oxidation; and should the skin of the structure reach temperatures of the order of 1455° C., the nickel will tend to melt and in doing so will absorb heat, thereby protecting the underlying structure. Other metals which may serve as temperature limiting agents would be rhodium (melting point 1985° C.), chromium (melting point 1890° C.), platinum (melting point 1773° C.), palladium (melting point 1595° C.), cobalt (melting point 1495° C.), gold (melting point 1063° C.). The limiting temperature should be chosen such that the physical strength of the matrix is not seriously impaired.

Or, in lieu of the filling materials mentioned hereinabove, a suitable synthetic plastic may be employed such as a material selected from the phenolics, epoxies, or polyesters; it being understood that the materials selected to form the various components of the structure of the present invention will depend upon the service conditions expected to be encountered.

Thus, it will be appreciated that in the case of the present invention a missile nose cone for example may be fabricated of a basic porous structure formed of multilayers of screening made for example of a highly heat resistive material having internal coating applications of a protective material, as indicated at 20 (FIG. 2) throughout the interior of the fabrication. Thus, a product, comprising a base metal fabrication of high heat strength metal structurally bonded together and surface-insulated against excessive erosion and/or oxidation and/or volatization loss, by means of the coating material 20.

FIG. 2 corresponds to FIG. 1 but illustrates how a fabrication of the invention may be constructed to comprise a porous base structure composed of nodules of high heat strength material as indicated at 22 which have been bonded together and surface-coated for protection against volatilization oxidation and/or loss by means of an internally deposited coating and pore filling methods referred to hereinabove may be, applied in the case of FIG. 2 whereby the pores of the structure will finally be filled as indicated at 25. FIG. 3 illustrates embodiment of the invention in connection with a fabrication consisting of a porous base composed of fibres or strands of basic material as indicated at 26 which have been initially "felted" together to form a tangle of fibres to comprise a porous mass throughout which a coating of material as indicated at 28 has been applied as explained hereinabove. Thus, the fabrication is bonded together and the strands 26 are protected against erosive and/or volatization deterioration as explained hereinabove. The pores are then filled as indicated at 30 by means explained hereinabove.

Thus, although only a few forms of the invention have been illustrated and described in detail hereinabove, it will be understood that various changes may be made therein without departing from the spirit of the invention or the scope of the following claims.

I claim:
1. The method of manufacturing a high heat resistant article, comprising the steps of agglomerating a mass of high heat strength parts to form a porous basic structure, interbonding and encapsulating said parts throughout said mass with a film of corrosive-erosive resistant material selected from the group consisting of tungsten, chromium, molybdenum and nickel of such thickness as to retain the porosity of the mass, and then filling the pores of the structure with a refractory material selected from the group consisting of alumina, nickel, rhodium, chromium, platinum, palladium, cobalt, gold, phenolic resin, epoxy resin and polyester resin.

2. The process according to claim 1 wherein said interbonding and encapsulating material is electrolessly deposited.

3. The process according to claim 1 wherein said interbonding and encapsulating material is deposited by chemical replacement.

4. The process according to claim 1 wherein said interbonding and encapsulating material is vapor phase deposited.

5. The process according to claim 1 wherein said interbonding and encapsulating material is deposited by thermal decomposition.

6. The method of making heat resistant articles, which comprises
agglomerating a plurality of molybdenum filaments to form a porous mass,
interbonding and encapsulating the filaments of said mass with a corrosive-erosive resistant material selected from the group consisting of molybdenum, tungsten, chromium and nickel, while retaining the porosity of said mass,
and then filling the pores of said mass with refractory material.

References Cited by the Examiner
UNITED STATES PATENTS

| | | | |
|---|---|---|---|
| 2,048,276 | 7/36 | Marlies | 29—195 |
| 2,177,567 | 10/39 | Imbault | 29—527 |
| 2,188,983 | 2/40 | Padowicz | 75—212 |
| 2,192,792 | 3/40 | Kurtz | 75—223 |
| 2,273,589 | 2/42 | Olt | 29—192 |
| 2,289,897 | 7/42 | Balke | 29—192 |
| 2,581,252 | 1/52 | Goetzel | 29—420 |
| 2,656,593 | 10/53 | Heintz | 29—527 |
| 2,691,815 | 10/54 | Boessenkool | 29—492.5 |
| 2,714,246 | 8/55 | Coffman | 29—195 |
| 2,881,094 | 4/59 | Hoover | 117—130 |
| 2,933,415 | 4/60 | Homer | 75—212 |
| 2,946,700 | 7/60 | Day | 75—208 |
| 2,975,073 | 3/61 | Delong | 117—130 |
| 2,996,795 | 8/61 | Stout | 29—420.5 |

DAVID L. RECK, *Primary Examiner.*
WHITMORE A. WILTZ, HYLAND BIZOT, ROGER L. CAMPBELL, *Examiners.*